Oct. 4, 1960    H. N. BLISS ET AL    2,954,925
PREDETERMINING COUNTER
Filed Nov. 23, 1955    3 Sheets-Sheet 1

INVENTORS
HARVEY N. BLISS
HAROLD B. VROOM
BY
Lindsey and Prutzman
ATTORNEYS

Oct. 4, 1960   H. N. BLISS ET AL   2,954,925
PREDETERMINING COUNTER
Filed Nov. 23, 1955   3 Sheets-Sheet 2

INVENTORS
HARVEY N. BLISS
HAROLD B. VROOM
BY
Lindsey and Prutzman
ATTORNEYS

Oct. 4, 1960    H. N. BLISS ET AL    2,954,925
PREDETERMINING COUNTER

Filed Nov. 23, 1955    3 Sheets-Sheet 3

INVENTORS
HARVEY N. BLISS
HAROLD B. VROOM
BY
*Lindsey and Prutzman*
ATTORNEYS

United States Patent Office 2,954,925
Patented Oct. 4, 1960

2,954,925

PREDETERMINING COUNTER

Harvey N. Bliss, Windsor, and Harold B. Vroom, Simsbury, Conn., assignors to Veeder-Root Incorporated, Hartford, Conn., a corporation of Connecticut Filed Nov. 23, 1955, Ser. No. 548,640

23 Claims. (Cl. 235—132)

This invention relates to counters and more particularly to counters of the repeating predetermining type.

By a predetermining type of counter is meant a counter having means to actuate an external control or indicating device in response to the registry of a predetermined number by the counter. By a repeating predetermining counter is meant a predetermining counter having duplicate means to indicate the count with the drive gearing for the indicators arranged so that one indicator will add from zero to a predetermined number while the other indicator complementally subtracts from the predetermined number to zero and having means to automatically reverse the cycle and actuate an external control or indicating device upon the registry of the latter indicator at zero and the former at the predetermined number. Upon reversal the first mentioned indicator will subtract from the predetermined number to zero while the second mentioned indicator will complementally add from zero to the predetermined number. The cycles will be automatically reversed and repeated until such time as the counter is disconnected from the operation to be counted or until the counted operation is halted.

It is an object of this invention to provide an improved repeating predetermining counter having means for mechanically actuating an external control device or indicator whenver the end of a counting cycle is reached.

It is another object of this invention to provide a repeating predetermining counter of the type described having novel and improved means for automatically shifting the drive mechanism of the counter at the end of each cycle.

It is another object of this invention to provide a counter of the type described having a means for resetting one of the indicators to zero, a portion of which resetting means is adapted to cause a cover on the counter to be opened when the resetting means is actuated to reset the first row of wheels to zero to provide a means of access to the other indicator to preset the indicator to a new predetermined number.

It is a further object of this invention to provide a counter of the type described wherein the drive mechanism to the indicators will be automatically disconnected from the indicators while the indicators are being repositioned.

It is still a further object of this invention to provide a counter of the type described wherein the drive shifting means will be neutralized while the indicators are being repositioned and further assures that on the initiation of the next counting cycle the drive means will be properly arranged so that the indicator preset to a predetermined number will subtract while the other indicator which has been reset to zero will add.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

It is believed that a general explanation of the functional operation of the counter herein described will be helpful in establishing a background providing easier understanding of the following description. It is to be observed that the counter has two parallel rows of number wheels, namely, A and B with the numerals on the wheels in row B being in opposite order from those on the wheels of row A. The drive gearing of the counter is such that the wheels in row A and the wheels in row B are synchronously rotated in the same direction during the operation of the counter. To set up the counter for a counting operation, the wheels in row A are set at zero and the wheels of row B are set at a predetermined number. In view of the rotation of the wheels of row A and row B in the same direction and in view of the reverse numbering of the wheels it is obvious that during the operation of the counter the wheels of row A will add from zero while the wheels of row B will subtract from the predetermined number. Further, due to the synchronous rotation of the wheels of row A and B, the wheels of row A will reach the predetermined number at the same time that the wheels of row B reach zero and during the interim the sum of the numbers registering on the wheels of rows A and B at any one instant will be the predetermined number. In accordance with the object of providing a repeating predetermining counter, it will be later seen and explained that there is provided a means to reverse the rotation of the number wheels upon registry of zero by one row of wheels and the registry of the predetermined number by the other row.

With reference to like numerals in the accompanying drawings, the counter embodying the present invention is mounted in a housing comprising base 10 and side walls 11a, 11b, 11c, and 11d. A wall 13 is mounted between sides 11a and 11c to provide support for various shafts hereinafter described. A drive shaft 20 is journaled in upright supports 14 and 15 on the base 10 and extends at one end beyond the side wall 11d for connection to the associated machine, etc. whose movements are to be registered or counted. Mounted on and fixed to the drive shaft 20 is a beveled gear 21 which meshes with beveled gear 22 mounted on shaft 23. Shaft 23 imparts motion to the gear train 24 to translate the speed of the drive shaft 20 to a predetermined rotative speed of the shaft 25 which is driven by the gear train 24 through the gear 26.

Figure 2:
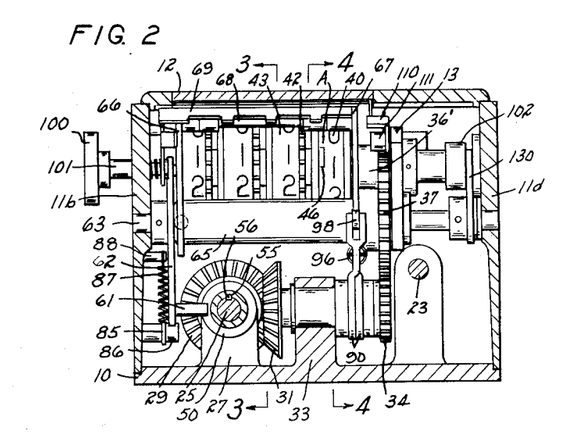
Figure 2 is a cross sectional side view with the counter turned 180° from the position shown in Figure 1.
Figure 4:
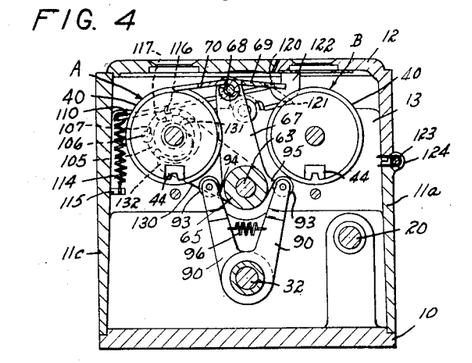
Figure 4 is a cross sectional end view of the counter along the lines 4—4 of Figure 2.

The shaft 25 is journaled in upstanding supports 27 and 28 on the base 10. Freely rotatably mounted on the shaft 25 are the beveled gears 29 and 30 which mesh with the bevel gear 31 disposed therebetween. Gear 31 is mounted on a shaft 32 which is journaled in upright support 33, mounted on base 10. Mounted on and fixed to the other end of the shaft 32 is the main gear 34 which meshes with idler gear 37 which in turn meshes with number wheel gears 35 and 36 as shown in Figure 2. The gears 35, 36 are connected to the first number wheels 40 by means of hubs 35', 36', respectively, to impart rotative movement to the lowest order number wheels 40. The counting operation wherein one complete revolution of a number wheel will cause the rotation of the number wheel of the next highest order by one unit is accomplished in a well known manner by means of driven gears 42 mounted on the remaining number wheels 43 of higher order, the two tooth driving gear segments 44 on the number wheels of lower order as shown in Figure 4, and transfer pinions 45.

The lowest order number wheels 40 have a notch 46 on one side of the periphery thereof with the trailing edge midway between the numerals 0 and 1, and each of the number wheels 43 of higher order have an identical notch 47 wtih the trailing edge in registry with the numeral 0 thereon for purposes to be hereinafter described.

Figure 5:
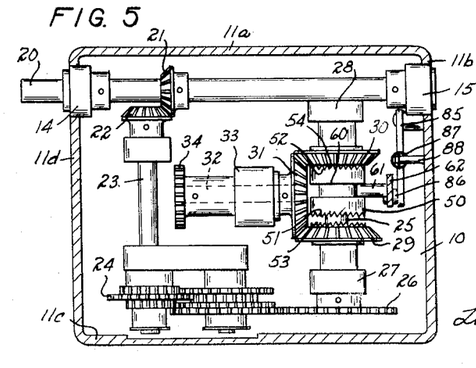
Figure 5 is a top view, partially in section, of the base portion of the counter showing the drive gearing and clutch mechanism.

With reference to Figure 5 it can be seen that if rotative motion is imparted to the drive shaft 20 this motion will be directed through the beveled gears 21 and 22 through gear train 24 to the gear 26 and thusly to shaft 25. A clutch 50 is mounted for rotation with the shaft 25 between the beveled gears 29 and 30 by means of a longitudinal keyway 55 in said shaft 25 and a key 56 cooperating with said shaft and the clutch to permit axial movement of the clutch. The ends 51 and 52 of the clutch 50 are toothed for engagement with correspondingly toothed portions 53 and 54 of the beveled gears 29 and 30. In the position of the mechanism shown in Figure 5 the toothed portion 52 of the clutch 50 is engaged with the toothed portion 54 of the beveled gear 30 to drive the gear 30. Gear 30 will then drive the gear 31, the main gear 34 and the idler gear 37 in one direction. If the clutch 50 is axially moved such that the toothed portion 53 thereof engages the gear 29, the gear 31 and thus the main gear 34 and the idler gear 37 will be driven in the opposite direction, it being presumed that rotation of the drive shaft 20 is always in the same direction.

An annular groove 60 is provided on the clutch 50 to accommodate a pin 61 which through a mechanism to be hereinafter described, moves the clutch 50 at the end of a count in either direction from engagement with gear 30 to engagement with gear 29 or vice versa. The pin 61 is mounted on one end of a clutch lever 62. This lever is fixed on shaft 63 which is journaled in sides 11b and 11d and extends through the wall 13. A slot 64 to form a lost motion connection is provided in the upper end of the clutch lever 62 for purposes to be hereinafter described. Rotatably mounted on the shaft 63 is a sleeve 65. Mounted on and fixed to one end of the sleeve 65 is crank lever 66. The movement of the lever 66 and thus the sleeve 65 is limited by the pins 82 mounted in the side 11b of the counter. At the opposite end of sleeve 65 there is mounted on and fixed thereto a lever 67. Mounted between and for movement with the crank 66 and the lever 67 is an actuating member comprising a hinge pin 68 on which is pivotally mounted hinge plates 69 and 70 having fingers or followers 80a, b, c, and d and 81a, b, c, and d, respectively, which extend toward the number wheels of rows A and B respectively.

A torsion spring 75 is mounted on the pin 68 with the free ends thereof engaging the top surfaces of the plates 69 and 70 to urge said plates downwardly into position for engaging with the peripheries of the number wheels as explained more fully hereinafter. During a counting operation, the hinge plates 69, 70 are shifted toward the subtracting row of number wheels so that the fingers of one hinge plate extending toward that row of number wheels will ride on the periphery of the wheels, overtravel being prevented by engagement of crank 66 with the adjacent pin 82. At the same time the other pin 82 engages under the other hinge plate to hold it out of engagement with the adding row of counter wheels. However, after the notches 47 of the wheels of higher order line up with the fingers which occurs when these wheels reach zero, the fingers of the associated hinge plate will be permitted to move into engagement with the notches by the spring 75 when the notch 46 on the lowest order number wheel lines up with the notches 47 on the remaining wheels. After the notch 46 is engaged by the finger associated therewith, continued rotation of the lowest order number wheel 40 to zero position will cause the hinge plates to be positively moved or driven toward the other row of number wheels. This motion of the hinge plates is transmitted through hinge pin 68 to the crank 66. Sufficient movement of the crank 66, which occurs as the number wheels reach zero position, will cause pin 71 to engage the end of the lost motion slot 64 in clutch lever 62 to pivot this lever and thus reverse the drive.

A cam lever 85 having a cam roller 86 is pivotally mounted at one end on side 11b of the counter. A spring 87 connected at one end to a pin 88 on side 11b and at the other end to the cam lever 85 urges the cam lever 85 in an upward direction to engage one side of a detent 89 on the bottom of the clutch lever 62. The cam roller 86 serves to retain the clutch lever 62 in either two pivotal positions. As has been described when the hinge plates 69 and 70 are moved from one wheel engaging position to the other through the coaction of the fingers of the hinge plates and the notches in the number wheels, the clutch lever 62 will be pivoted. As the clutch lever is pivoted the detent 89 will force the cam roller 86 downward until the cam roller passes the dead-center position with respect to the detent wherein the cam roller will then be urged upwardly by the spring 87 to maintain the clutch lever in its shifted position. The movement of the clutch lever will through the coaction of the pin 61 and the annular groove 60 on the clutch 50 move the clutch out of engagement with one of the beveled gears 29 and 30 into engagement with the other. From the above it can be seen that every time the notches on the subtracting number wheels are aligned to zero as a result of the completion of a counting cycle, the driving means of the counter as applied to the number wheel of lowest order is utilized to move the hinge plates toward and into peripheral engagement with the other set of number wheels while the movement of the hinge plates will also result in the shifting of the clutch 50 to reverse the rotation of the number wheels to repeat the counting cycle.

Completion of the movement of the hinge plates 69 and 70 from one position to the other with a snap action is assured by the action of the lever 67 in which one end of the hinge pin 68 is mounted. Co-operating with the lever 67 are two bifurcated positioning levers 90. The levers 90 are pivotally mounted on the hub of the main gear 34 and are urged toward each other by the spring 96 mounted therebetween. Cam rollers 93 are mounted between the forked elements of the levers 90 and coact with the detents 94 and 95 on the lever 67 in such a manner that whenever one of the rollers is in engagement with one side of one of the detents the other roller is in engagement with the other side of the other detent. Thus, as the lever 67 is pivoted through the coaction of the number wheels and the hinge plates the detents 94 and 95 will force apart the bifurcated positioning levers 90 against the action of spring 96 until the detents pass over the dead-center position with respect to the cam rollers 93 wherein the positioning levers 90 will be urged towards each other by the spring 96. This movement of the cam levers 90 will force the cam rollers 93 to the opposite sides of the detents 94 and 95 to assure that the hinge plates are fully moved into engaging position with the periphery of the opposite set of number wheels and to further assure that the hinge plates will remain in the proper engaging position.

It should be noted at this point that it is the notches 46 in the lowest order number wheels 40 which actually provide the operating force for movement of the hinge plates from one position to the other. The notches 47 in the remaining number wheels 43 merely provide an indexing means to prevent the engagement of the additional fingers 80a and 81a with the notches 46 unless the remaining wheels are aligned at zero. The notches 46 are placed so that the movement of the hinge plates from one position to the other will be initiated slightly before the lowest order number wheel reaches zero to provide a short time delay necessary to shift the plates 69 and 70 to the opposite position and to assure that the plates will have been shifted at the completion of the predetermined count. The lost motion slot heretofore mentioned in the clutch lever 62 is provided to assure that the movement of the clutch 50 from one position to the other to change the direction of rotation of the number wheels will not take place until the completion of the predetermined count and registry of the subtracting wheels at zero. Thus, the shifting of the plates 69 and 70 will be initiated slightly before the completion of the counting cycle while the clutch will not be disengaged and re-engaged until the cycle has been completed.

Figure 3:
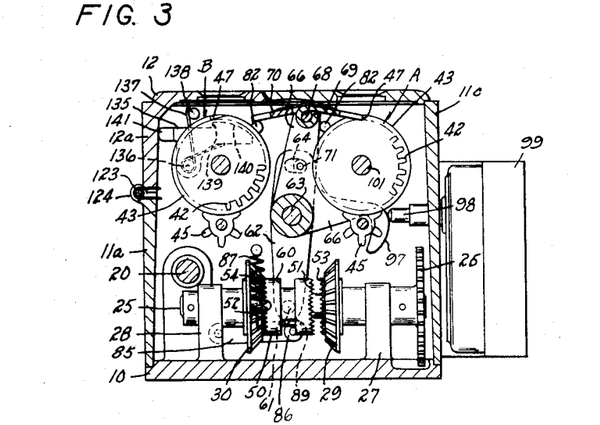
Figure 3 is a cross sectional end view of the counter along the lines 3—3 of Figure 2.

In order to provide a means of correlating the end of a counting cycle with the energizing of an external control, one end of the crank 66 is provided with an arcuate cam surface 97 which is shown in contact with the push rod 98 of a microswitch 99. It, of course, should be understood that the crank 66 could be adapted to actuate other control devices such as a hydraulic valve, the microswitch 99 being shown merely by way of example. The microswitch may be in series with an external electrical control circuit such as a shut off means for the operation being counted. As the hinge plates 69 and 70 and thus the crank 66 are moved from one position to the other, the arcuate cam surface of the crank 66 will be moved in an arc relative to the mircoswitch lever 98, the shape of the cam surface 97 being such that as the crank 66 is moved in either direction the push rod 98 will be moved to the right, as viewed in Figure 3, an amount sufficient to actuate the switch 99. The cam surface is so designed and the selection of the microswitch such that the actuation of the switch will not take place until the counting cycle has been completed. Each time the hinge plates are moved from one position to the other the crank will move beyond the position wherein the cam surface 97 actuates the switch 99 in order that the lever 98 may be returned to its leftmost position as shown in Figure 3, where it is in position to be actuated at the end of the next counting cycle. Therefore, the switch 99 will be actuated each time the hinge plates 69 and 70 are moved from one position to the other.

A resetting knob 100 is provided for the resetting of the number wheels of row A. This knob is mounted on reset shaft 101 which is slidably mounted and journaled at one end in side 11b of the counter. The reset shaft 101 extends coaxially of the number wheels of row A and through wall 13 and is slidably mounted and rotatably journaled at its other end in retainer 102 mounted in side 11d of the counter. A spring 103 is located between the other end of the reset shaft 101 and the inner wall of a retainer 102 to maintain the shaft 101 in the position shown in Figure 1 at all times except when the counter is being reset. The number wheels of row A of the counter are reset to zero in a well known manner upon the rotation of the reset knob 100 and shaft 101 through one revolution by the usual coaction of a longitudinal slot in the shaft 101 with pickup pawls disposed internally of the number wheels (not shown).

A locking sleeve 105 is mounted on and pinned to the reset shaft 101. This sleeve is normally in juxtaposition with wall 13 to form a stop means to preclude any movement of the reset shaft to the right from the position shown in Figure 1, and thus serves in combination with the retainer 102 to limit the movement of the shaft 101. When the reset shaft is in the position shown in Figure 1 it is prevented from being rotated by means of a locking pin 106 which is in engagement with a notch 107 in the periphery of the locking sleeve 105. When the reset shaft is moved inwardly to reset the wheels of row A, the sleeve 105 is moved in the same direction to disengage the locking pin 106 from the notch 107 in the sleeve 105 to permit rotation of the reset shaft and resetting of the wheels. The spring 103 will maintain the right side of the sleeve 105 as viewed in Figure 1 in engagement with the end of the locking pin 106 while the shaft 101 is being manually rotated so that as the notch 107 is rotated into registry with the pin 106 the shaft 101 will be urged to the right to lock the shaft in the proper rotative position with the number wheels in row A zeroized.

Figure 1:
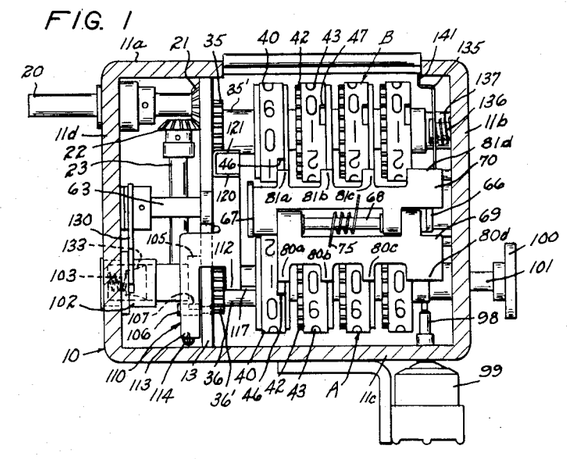
Figure 1 is a top view of a meter embodying the present invention with the housing in cross section.
Figure 6:
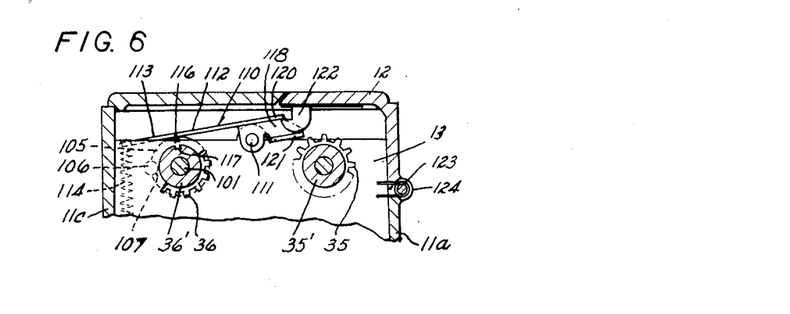
Fig. 6 is a fragmentary cross sectional view of a portion of the counter illustrating the latching mechanism for the cover.
Figure 7:
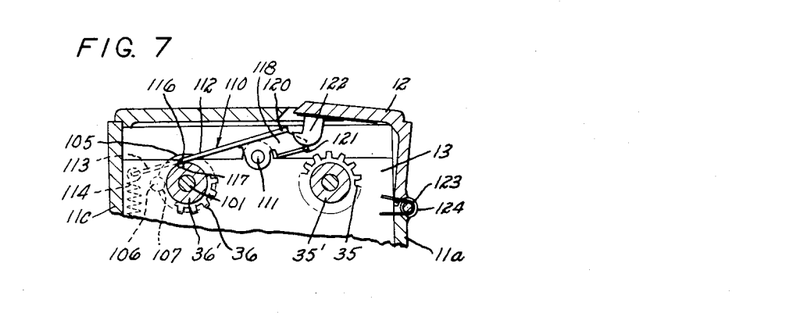
Fig. 7 is a fragmentary cross sectional view similar to Fig. 6 with the cover latching elements in a different operative position.

A latching lever 110 which, as shown in Figures 1, 6 and 7 comprises a sheet metal plate having a depending flange 118 extending partially along one edge thereof, is pivotally mounted intermediate its ends on the wall 13 by means of a stud 111 extending through the flange 118. The other end of the lever 110 is forked to provide the locking fingers 112 and 113 so disposed that the finger 112 lies to the right of wall 13 while finger 113 lies to the left, as viewed in Figure 1. Normally, the finger 113 is maintained in abutting relationship with the top of the locking sleeve 105 by means of a spring 114 connected at one end to the free end of finger 113 and at its other end to a pin 115 in the side 11c of the counter. When the reset shaft 101 is moved to the left as viewed in Figure 1, the locking sleeve 105 will be moved to the left a distance sufficient to permit the finger 113 of the lever 110 to be urged downwardly between the wall 13 and the locking sleeve 105. The locking sleeve 105 is then maintained out of engagement with the finger 113 by the locking pin 106 which is in wiping contact with the side of the locking sleeve 105 until the reset shaft 101 has made one complete revolution, whereupon the notch 107 in the periphery of the locking sleeve 105 will again register with the locking pin 106. At this point, the spring 103 will urge the locking sleeve to the right, as viewed in Figure 1, to an abutting relationship with the finger 113 of the lever 110. The reset shaft 101 will be maintained in this leftward position until the finger 113 is pivoted out of interference with the sleeve 105 in a manner hereinafter described.

A slot 117 is provided in the hub 36' at a point corresponding to the zero position of the lowest order number wheel 40 of row A. When the reset shaft 101 has been rotated an amount sufficient to reset the lowest order number wheel to zero the pawl 116 on the finger 112 of the lever 110 will engage the slot 117 to lock the number wheel gears 35 and 36 and the main gear 34. This locking of the number wheel and main gears is provided so that once wheels of row A have been reset to zero any movement of the number wheel in row B will not disturb the zero setting of wheels in row A.

The lever 110 at its end opposite the fingers 112, 113 forms a latching finger portion 120, and a positioning finger portion 121 is formed by a flange extending at right angles from the bottom edge of the flange 118. When the hinged door 12 of the counter is in a closed position the latching finger 120 engages the keeper 122 mounted on the door 12 to retain the door in its closed position. When the reset shaft 12 is moved inwardly thus resulting in the pivoting of the lever 110 as heretofore described, the latching finger 120 will be moved out of latching engagement with the keeper 112, whereupon the door 12 will be urged open by means of a spring 123 disposed about a hinge 124 which connects the door 12 to the side 11a of the counter. Thus it can be seen, that whereever the reset lever 101 is moved inwardly to reset the wheels in row A the door 12 will automatically be opened to give access to the number wheels in row B to permit repositioning of these wheels to a new predetermined number.

The inward movement of the reset shaft 101 also serves the function of positioning the hinge plates 69 and 70 out of engagement with both rows of number wheels as well as disengaging the clutch 50 from both beveled gears 29 and 30 so that any inadvertent rotation of the drive shaft 20 during the resetting operation will not impart corresponding rotation to the number wheels. To accomplish the first function, that of centering the hinge plates 69 and 70, a centering lever 130 is mounted on and fixed to the shaft 63 on which is also mounted the crank 66 and the lever 67. Thus, any rotation of the centering lever 130 will impart a pivoting motion to the crank 66 and the lever 67 and thus the hinge plates 69 and 70. The centering lever 130 is bifurcated at its free end into tongues 131 and 132. The reset shaft 101 is beveled at its leftward end as viewed in Figure 1 to provide a cam surface 133. As shown in Figure 4 when the reset shaft is in its outward position and the hinge plate 69 is in engagement with the number wheels of row A the tongue 131 of the centering lever 130 will be in engagement with the cam surface 133 of the resetting shaft 101. As the resetting shaft is moved inwardly the tongue 131 will ride up on the cam surface 133 thus causing the centering lever 130 to be pivoted in a clockwise direction as viewed in Figure 4. The slope of the cam surface 133 is such that the normal inward movement of the shaft 101 will result in the hinge plates 69 and 70 being positioned offset to the right of the mid-point between the number wheels A and B but disengaged from the wheels row B, as viewed in Figure 4. In this position the hinge plates are out of engagement with both rows of number wheels with the detents 94 and 95 of the lever 67 positioned slightly clockwise of the dead-center relationship between the detents and the cam rollers 93 of the positioning lever 90. This positioning is critical in that it will assure that when the hinge plates are next moved into engagement with a row of number wheels the row of number wheels engaged will be row B and not row A. The reason for this is, of course, obvious in that row B at the beginning of a new counting operation will have been set to the predetermined number and will thus be the row of wheels subtracting during the initial cycle and thus will control the shifting of the hinge plates at the end of the counting cycle. In order to assure that the hinge plate 70 will be maintained out of engagement with the number wheels in row B during the repositioning operation, there is provided a lever 135 which is pivotally mounted on side 11b of the counter by means of a pin 136. A spring 137 is mounted on the pin 136 with one free end engaging the bottom of the lever 135 and the other free end engaging the pin 138 in side 11b. The spring 137 is so disposed that the lever 135 is urged in a counterclockwise direction, as viewed in Figure 3, when the cover 12 is opened. The rotation of the lever 135 in a counterclockwise direction is limited by the pin 138 which is so located that when the shoulder 139 of the lever 135 engages said pin, the arcuate surface 140 of the lever 135 is disposed above the periphery of the number wheels in row B to assure that the hinge plate 70 will not engage the periphery of these number wheels during the repositioning operation. As the door 12 is manually closed, the side 12a of the door will engage the end 141 of the lever 135 and rotate the lever in a clockwise direction as viewed in Figure 3 and will maintain the lever 135 in the position shown in Figure 3 through the coaction of the side 12a of the door and the ends 141 of the lever 135 when the door has been closed. The number wheels of row B are provided with means (not shown) whereby the wheels may be manually rotated independently of the driven gears 42 to preset the number wheels of row B to a new predetermined number. When this has been accomplished, it is necessary to close the door 12 prior to the beginning of the next counting operation. As the door 12 is closed, the positioning finger portion 121 of the lever 110 will be engaged by the keeper 122 and will result in the lever 110 being rotated in a clockwise direction as viewed in Figure 7.

When the door 12 is completely closed, the latching finger 120 of the lever 110 will have engaged the keeper in the manner shown in Figure 6, and will maintain the door in a closed position. As the lever 110 is rotated in a clockwise direction, the locking finger 113 of the lever 110 will be moved upwardly against the force of the spring 114 to release the locking sleeve 105 of the reset shaft 101 and permit the shaft 101 to be urged to the right, as viewed in Figure 1, by means of the spring 103. Also, as the lever 110 is rotated in a clockwise direction, the pawl 116 on the end of the finger 112 of the lever 110 will be lifted out of engagement with the slot 117 in the hub of the number wheel gear 36 to unlock the number wheels 35 and 36 and main gear 34. Further, as the reset shaft 101 is urged outwardly by means of the spring 103 the cam surface 133 on the end of said shaft will also be withdrawn relative to the tongue 131 of the centering lever 130. This will permit the spring 96 to urge the positioning levers 90 toward each other, thus through the coaction of the cam rollers 93 and the detents 94 and 95 of the lever 67 urging the hinge plate 70 into engagement with the periphery of the number wheels in row B.

From the above description and following explanation, it is believed that the operation of the counter herein described will be obvious. To set up the counter for the beginning of a counting operation, the reset knob 100 is moved inwardly to correspondingly move the reset shaft 101 and the locking sleeve 105 to permit the lever 110 to be pivoted by the spring 114 to release the latching finger 120 of the lever 110 from engagement with the keeper 122 of the door 12, whereupon, the spring 123 will urge the door open. The inward movement of the shaft 101 through the cam surface 133 thereon will cause the centering lever 130 to be pivoted in a clockwise direction, as viewed in Figure 4, to position the hinge plate 70 adjacent the number wheels in row B. This last described movement of the centering lever 130 will take place if at the end of the last counting operation, the hinge plate 69 was in engagement with the periphery of the number wheels in row A. However, if at the end of the last counting cycle, the hinge plate 70 was in engagement with the periphery of the number wheels in row B, the inward movement of the reset shaft 101 and its associate cam surface will, through the engagement of the said cam surface and the tongue 132 of the centering lever 130, cause the centering lever to be pivoted in a counterclockwise direction, as viewed in Figure 4, an amount necessary to position the hinge plate 70 just out of engaging position with the number wheels in row B.

The inward movement of the reset shaft 101 and the corresponding pivoting of the lever 130 will further result in the rotation of the shaft 63 and the pivoting of the clutch lever 62 to disengage the clutch 50 from the beveled gears 29 and 30.

The reset knob 100 is turned one complete revolution to reset the number wheels of row A to zero, whereupon, the notch 107 of the locking sleeve 105 will be in registry with the locking pin 106 mounted on the wall 13. The spring 103 will then urge the reset shaft to the right, as viewed in Figure 1, whereupon the locking sleeve 105 will engage the finger 113 of the lever 110 and thus retain the reset shaft in its inward position.

The number wheels in row B are then manually preset to the predetermined number to which it is desired to count and the door 12 is manually closed. As the door is closed, the keeper 122 will engage the positioning finger 121 of the lever 110 to rotate this lever in a clockwise direction, as viewed in Figure 4, until the latching finger 120 of said lever engages the keeper to retain the cover in closed position. This clockwise rotation of the lever 110 will result in the finger 113 being moved upwardly out of engagement with the locking sleeve 105 permitting the reset shaft 101 to be moved by means of the spring 103 to its outward position. This outward movement of the reset shaft 101 releases the centering lever 130 to permit the hinge plate 70 to be moved into engagement with the periphery of the number wheels in row B by means of the positioning levers 90. The counter is now in readiness for the beginning of the counting operation inasmuch as the movement of the hinge plates and thus the shaft 63 will result in the pivoting of the clutch lever 62 to engage the clutch with the beveled gear 29.

During the operation of the counter, when the notches on the number wheels in row B are in alignment upon the completion of the counting cycle, the hinge plate 70 will be urged into engagement with said notches. Further rotation of the lowest order number wheel to zero will move the hinge plate 70 and thus the hinge plate 69 and the associated crank 66 and lever 67 in a clockwise direction as viewed in Figure 3. This movement of the hinge plate 70 by the lowest order number wheel will cause the lever 67 to be pivoted past the dead-center relationship with the cam rollers 93 on the positioning levers 90 whereupon the spring 96 will provide a snap action to assure the engagement of the hinge plate 69 with the periphery of the number wheels in row A. The initial movement of the hinge plate 70 and thus the crank 66 will not be imparted to the clutch lever 62 because of the lost motion slot in said clutch lever. However, just prior to the engagement of the hinge plate 69 with the periphery of the number wheels in row A and coincidental with the registering of the number wheels in row B at zero, the crank 66 will move the clutch lever 62 in a clockwise direction as viewed in Figure 3 to disconnect the clutch 50 from the beveled gear 29 and engage said clutch with the beveled gear 30 thus reversing the rotation of the number wheels in rows A and B. It can be seen that this cycle will repeat itself indefinitely as long as the counter is maintained in operation.

The crank 66 each time it is shifted at the end of a counting cycle will actuate the push rod 98 of the microswitch 99 to energize or de-energize, as may be desired, an external circuit.

Thus it can be seen that there has been provided a new and improved repeating predetermining counter having novel means for shifting the drive gearing of the counter wherein the shifting will take place at the exact moment the subtracting wheels reach zero and not before. This shifting mechanism is simple and positive in operation and assures that the shifting from one cycle to the next will be accomplished each time the subtracting row of wheels reaches zero with no possibility of overrun. It can also be seen that there has been provided a novel and improved means to automatically co-ordinate the resetting of one of the rows of wheels to zero with other operations necessary to the repositioning of the other row of wheels to a new predetermined number. The mechanism disclosed is foolproof in operation and is capable of delivering long periods of trouble-free operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. In a repeating predetermining counter, a pair of parallel counters adapted to complementally add and subtract each counter comprising a set of rotatable number wheels of different order, an actuating member mounted for movement between tangential engagement with the periphery of one set of number wheels and tangential engagement with the periphery of the other set of number wheels, and means on the number wheel of lowest order of each counter to form a driving connection with said actuating member at a predetermined rotated position of said number wheels to move said actuating member from peripheral engagement with one of said counters and toward peripheral engagement with the other of said counters.

2. In a repeating predetermining counter, a pair of parallel counters adapted to complementally add and subtract, each comprising a set of rotatable number wheels of different order, an actuating member mounted for movement between tangential engagement with the periphery of one set of number wheels and tangential engagement with the periphery of the other set of number wheels, said actuating member being mounted for movement radially of said number wheels, each number wheel of lowest order of each set having a notch to form a driving connection with said actuating member to move said actuating member from peripheral engagement with one set of number wheels and toward peripheral engagement with the other set of number wheels, each of the remaining number wheels having notches permitting such driving connection at a predetermined rotated position of said number wheels, and means yieldably urging said actuating member in a tangential direction toward the engaged set of number wheels.

3. In a repeating predetermining counter, a pair of parallel counters adapted to complementally add and subtract, each comprising a set of rotatable number wheels of different order, driving means connected to the number wheel of lowest order of each counter, a movable clutch element connected to said driving means and adapted, upon actuation, to reverse the direction of rotation of said number wheels, an actuating member mounted for movement between tangential engagement with the periphery of one set of number wheels and tangential engagement with the periphery of the other set of number wheels, a follower on said actuating member movable radially of said number wheels, a notch on each number wheel of lowest order for engaging and forming a driving connection with said follower and actuating member, corresponding notches on the wheels of higher order to permit engagement of the follower with a notch of a wheel of lowest order at a predetermined rotated position of said number wheels to move said actuating member from peripheral engagement with one of said counters to peripheral engagement with the other of said counters, and means connecting said actuating member to said clutch element to move said element and reverse the direction of rotation of said number wheels at a predetermined position of said actuating member.

4. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever mounted for oscillation between the two sets of counter wheels, and a follower on the lever mounted for movement radially of the number wheels, said number wheels having notches for receiving the follower when the number wheels of higher order are in zero position and the units wheel is approaching zero position.

5. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever pivotally mounted for oscillation between the two sets of counter wheels, a pair of followers pivotally mounted on the lever for engagement, respectively, with the peripheries of the two sets of counter wheels, and means biasing the followers radially of the number wheels, said number wheels having notches for receiving the follower when the number wheels of higher order are in zero position and the units wheel is approaching zero position to drive the actuating lever toward the other set of counter wheels.

6. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever pivotally mounted for oscillation between the two sets of counter wheels, a pair of followers pivotally mounted on the lever for engagement, respectively, with the peripheries of the two sets of counter wheels, means biasing the followers radially of the number wheels, said number wheels having notches for receiving the follower when the number wheels of higher order are in zero position and the units wheel is approaching zero position to drive the actuating lever toward the other set of counter wheels, and stop means for limiting pivotal movement of the followers during disengagement from the counter wheels.

7. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever pivotally mounted for oscillation between the two sets of counter wheels, a pair of followers pivotally mounted on the lever for engagement, respectively, with the peripheries of the two sets of counter wheels, means biasing the followers radially of the number wheels, said number wheels having notches for receiving the follower when the number wheels of higher order are in zero position and the units wheel is approaching zero position to drive the actuating lever toward the other set of counter wheels, and means biasing the actuating lever away from a neutral position intermediate the sets of counter wheels.

8. In a repeating predetermining counter, two parallel spaced apart counters adapted to alternately and complementally add from zero to a predetermined number and subtract from a predetermined number to zero, each of said counters comprising a plurality of operatively connected number wheels of different order, driving means operatively connected to the number wheels of lowest order, a movable reversing element operatively connected to said driving means to selectively drive said driving means in either direction, an actuating member for the reversing element mounted for movement between the counters generally tangentially thereof and comprising a pair of followers hingedly mounted and respectively associated with each of said counters, said number wheels having notches for receiving the associated follower at a predetermined count, and means urging said followers into notch engagement, the notches on the lowest order number wheels forming a driving connection between the subtracting counter and said actuating member to move said actuating member out of engagement with the subtracting counter and toward engagement with the other counter as the count approaches zero.

9. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever pivotally mounted for oscillation between the two sets of counter wheels and having means for drivingly engaging the number wheel of lowest order as the set of counter wheels approach zero position, means for zeroizing one set of counter wheels, and means responsive to the last named means for moving the actuating lever to a neutral position between the two sets of counter wheels during resetting.

10. In a predetermining counter of the type having two sets of counter wheels of different order counting in opposite directions, gearing for simultaneously rotating said counters, and a reversing clutch for transmitting a drive to said gearing, means for reversing the action of said clutch whenever the wheels of either one of said counters reaches zero position comprising an actuating lever pivotally mounted for oscillation between the two sets of counter wheels and having means for drivingly engaging the number wheel of lowest order as the set of counter wheels approach zero position, means for zeroizing one set of counter wheels, and means responsive to the last named means for moving the actuating lever into engagement with the other set of counter wheels upon completion of a resetting operation.

11. In a predetermining counter, a pair of parallel counters each comprising a plurality of rotatable number wheels, an actuating member mounted for alternate tangential engagement with the periphery of the number wheels of each of said counters, a reset shaft mounted for movement relative to one of said counters, and means selectively connecting said reset shaft to said actuating member to position said actuating member intermediate and out of engagement with both of said counters when said reset shaft is moved relative to said one counter.

12. In a predetermining counter, a pair of parallel counters each comprising a plurality of number wheels of different order, driving means connected to the lowest order number wheel of each of said counters, a movable clutch element operatively connected to said driving means, an actuating member mounted for alternate tangential engagement with the periphery of the number wheels of each of said counters, a reset shaft mounted for movement relative to one of said counters, means selectively connecting said reset shaft to said actuating member to position said actuating member intermediate and out of engagement with both of said counters when said reset shaft is moved relative to said one counter, and means connecting said actuating member to said clutch element to disengage said clutch element from said driving means in response to movement of said actuating member.

13. In a predetermining counter, a pair of parallel counters each comprising a pluality of rotatable number wheels, an actuating member mounted for alternate tangential engagement with the periphery of the number wheels of each of said counters, a reset shaft mounted for movement relative to one of said counters from an initial position, means to permit presetting of the other of said counters to a preselected number, means connecting said actuating member to said reset shaft to position said actuating member intermediate and out of engagement with both of said counters when said reset shaft is moved relative to said one counter from said initial position, and means for moving said actuating member toward said presettable counter upon return of the reset shaft to initial position.

14. In a predetermining counter, a pair of parallel counters each comprising a plurality of rotatable number wheels, an actuating member mounted for alternate engagement with the periphery of the number wheels of each of said counters, a reset shaft mounted for movement relative to one of said counters from an initial position, means to permit presetting of the other of said counters to a preselected number, spring means to urge said actuating member toward tangential engagement with either of said counters from a center position relative to said counters, and means connecting said actuating member to said reset shaft to position said actuating member out of engagement with both of said counters in response to movement of the reset shaft from said initial position and in an intermediate position between engagement with the presettable counter and said center position, said actuating member being disconnectable from said reset shaft in response to return of said reset shaft to said initial position to permit said spring means to urge said actuating member into engagement with said presettable counter.

15. In a predetermining counter, an enclosing casing, a pair of parallel counters each comprising a plurality of rotatable number wheels, an actuating member mounted for alternate engagement with the periphery of the number wheels of each of said counters, means to reset one of said counters to zero, means to permit presetting of the other of said counters to a preselected number, a cover hingedly mounted on said casing in registry with said presettable counter, means to open said cover in response to actuation of said resetting means, and means responsive to the opening of said cover to preclude engagement of said actuating member with said presettable counter.

16. In a predetermining counter, an enclosing casing, a pair of parallel counters each comprising a plurality of rotatable number wheels, an actuating member mounted for alternate engagement with the periphery of the number wheels of each of said counters, means to reset one of said counters to zero, means to permit presetting of the other of said counters to a preselected number, a cover hingedly mounted on said casing in registry with said presettable counter for movement between a closed and an open position, means to open said cover in response to actuation of said resetting means and means responsive to the movement of said cover to the open position to obstructingly preclude engagement of said actuating member with said presettable counter, said last-mentioned means being movable out of obstructing relationship with said actuating member as said cover is being moved to a closed position from said open position.

17. In a predetermining counter an enclosing casing, a pair of parallel counters each comprising a plurality of rotatable number wheels, an actuating member mounted for alternate engagement with the periphery of the number wheels of each of said counters, means biasing the actuating member radially toward engagement with said number wheels, spring means to urge said actuating member toward engagement with either of said counters from a center position relative to said counters, means to reset one of said counters to zero including a reset shaft mounted for movement relative to said one of said counters from an initial position, positioning means connecting said reset shaft to said actuating member to move said actuating member to an intermediate position between said center position and a position corresponding to engagement with the other counter in response to movement of said reset shaft from said initial position, a cover hingedly mounted on said casing in registry with said other counter, means to open said cover in response to movement of said reset shaft from said initial position, and obstructing means responsive to opening of said cover to urge said actuating member radially outwardly of said other counter against the force of said biasing means, said obstructing means being movable out of engagement with said actuating member in response to closing of said cover and said positioning means being disconnectable from said reset shaft in response to return of said shaft to said initial position to permit said spring means to move said actuating member toward engagement with said presettable counter.

18. In a predetermining counter an enclosing housing, a pair of parallel counters each comprising a plurality of number wheels, a reset shaft mounted for rotatable and axial movement relative to one of said counters, a door on said housing associated with the other of said counters and having a depending latch keeper, a latching lever mounted intermediate its ends for pivotal movement between a latched and an unlatched position, said lever being engaged at one end with said keeper when in the latched position, a spring urging said lever to the unlatched position, a positioning portion on said one end of said lever engageable by said keeper as said door is moved to the closed position to move said lever to the latched position, and locking means on said shaft adapted to engage and maintain said latching lever in the latched position, said locking means being disengageable from said lever as said shaft is moved axially of said one counter, said lever being mounted to obstructively engage said locking means when in the unlatched position.

19. In a predetermining counter, a plurality of rotatable number wheels of different order, means for driving the number wheels, actuating means mounted for movement in an actuating direction relative to said number wheels, means biasing the actuating means toward said number wheels, means on each of said number wheels to receive said actuating means at a predetermined rotated position of the number wheels, the means on the number wheel of lowest order for receiving the actuating means being engageable therewith to drive said actuating means in said actuating direction and out of engagement with said number wheels, and means to hold said actuating means out of number wheel engagement operable in response to movement of the actuating means in said actuating direction.

20. In a predetermining counter a plurality of rotatable number wheels of different order, driving means for driving the number wheels in one direction, actuating means mounted for movement in an actuating direction relative to said number wheels, means on each of said number wheels to receive said actuating means at a predetermined rotated position of the number wheels, the means on the lowest order number wheel for receiving said actuator means being engageable therewith to move said actuating means in said actuating direction, and means responsive to movement of said actuating means in said actuating direction for rendering said driving means ineffective to rotate said number wheels in said one direction.

21. In a predetermining counter, a plurality of rotatable number wheels of different order each having a notch on the periphery thereof, means for driving the number wheels in one direction including a clutch, actuating means mounted for movement in an actuating direction relative to said wheels and including follower means engageable with the periphery of said wheels in wiping contact in the locus of said notches, said follower means being engageable in said notches when the notches are brought into registry therewith at a predetermined rotated position of the number wheels, means biasing the follower means toward notch engagement, the notch of the lowest order number wheel having a surface engageable with said follower means to provide a driving connection to move the actuating means in said actuating direction, a yieldable latch for holding said actuating means out of number wheel engagement operable in response to movement of said actuating means relative to said wheels, and means operably connecting said actuating means and said clutch for actuation of the clutch in response to the movement of the actuating means relative to said wheels.

22. In a predetermining counter, a pair of counters each comprising a rotatable number wheel, actuating means mounted for movement relative to said counters, driving means associated with and mounted for movement with each number wheel, the driving means associated with each of the number wheels forming a driving connection with said actuating means at a predetermined rotated position of the respective counter to drive said actuating means toward the other number wheel for subsequent driving engagement in the reverse direction by the driving means associated therewith, and means biasing the actuating means toward the driving means next engageable therewith.

23. In a repeating predetermining counter, a pair of counters each comprising a set of rotatable number wheels of different order, actuating means mounted for movement between peripheral engagement with one set of number wheels and peripheral engagement with the other set of number wheels, means on the number wheel of lowest order of each counter forming a driving connection with said actuating means at a predetermined rotated position of said number wheels to move said actuating means from peripheral engagement with one of the counters and toward peripheral engagement with the other of said counters, and means biasing the actuating means toward engagement with the lowest order number wheel next drivingly engageable therewith.

References Cited in the file of this patent

UNITED STATES PATENTS

| | | |
|---|---|---|
| 1,873,760 | Green | Aug. 23, 1932 |
| 2,082,391 | Granberg | June 1, 1937 |
| 2,099,463 | Bradley | Nov. 16, 1937 |
| 2,147,233 | Beniek | Feb. 14, 1939 |
| 2,269,330 | Andren et al. | Jan. 6, 1942 |